US011750113B2

United States Patent
Makimura et al.

(10) Patent No.: US 11,750,113 B2
(45) Date of Patent: Sep. 5, 2023

(54) INVERTER DEVICE

(71) Applicant: SANDEN AUTOMOTIVE COMPONENTS CORPORATION, Isesaki (JP)

(72) Inventors: Yuki Makimura, Isesaki (JP); Masataka Matsuda, Isesaki (JP); Shogo Fujisaki, Isesaki (JP); Masatoshi Saito, Isesaki (JP)

(73) Assignee: SANDEN CORPORATION, Isesaki (JP)

( * ) Notice: Subject to any disclaimer, the term of this patent is extended or adjusted under 35 U.S.C. 154(b) by 61 days.

(21) Appl. No.: 17/600,770

(22) PCT Filed: Apr. 14, 2020

(86) PCT No.: PCT/JP2020/016358
§ 371 (c)(1),
(2) Date: Oct. 1, 2021

(87) PCT Pub. No.: WO2020/226029
PCT Pub. Date: Nov. 12, 2020

(65) Prior Publication Data
US 2022/0200482 A1 Jun. 23, 2022

(30) Foreign Application Priority Data

May 7, 2019 (JP) .................................. 2019-087414

(51) Int. Cl.
*H02P 27/08* (2006.01)
*H02M 7/5387* (2007.01)
(Continued)

(52) U.S. Cl.
CPC ........... *H02M 7/5387* (2013.01); *H02M 1/14* (2013.01); *H02P 27/08* (2013.01); *H02P 29/68* (2016.02)

(58) Field of Classification Search
CPC ...... H02P 27/08; H02P 29/68; H02M 7/5387; H02M 1/14; H02M 1/327
See application file for complete search history.

(56) References Cited

U.S. PATENT DOCUMENTS 7,859,207 B2 * 12/2010 Yamada ................. H02P 21/34
 318/471
9,048,771 B2 * 6/2015 Ohba ....................... H02P 29/62
(Continued)

FOREIGN PATENT DOCUMENTS

JP 2009-060776 A 3/2009
JP 2010-075048 A 4/2010
(Continued)

OTHER PUBLICATIONS

Japan Patent Office, International Search Report issued in International Application No. PCT/JP2020/016358, dated Jun. 23, 2020.

*Primary Examiner* — Rina I Duda
(74) *Attorney, Agent, or Firm* — Baker Botts L.L.P.

(57) ABSTRACT

An inverter device is provided which is capable of more quickly raising an internal temperature of an electrolytic capacitor within a permissible range of a ripple voltage to shorten a non-operating time. The inverter device includes an electrolytic capacitor, an inverter circuit, a temperature sensor, and a control device. When the ambient temperature of the electrolytic capacitor detected by the temperature sensor is lower than a predetermined temperature, the control device on-drives specific switching elements of the inverter circuit before the start of a normal operation of a motor, and executes a warming up operation of allowing a current capable of controlling a ripple voltage of a DC voltage within a permissible range to flow through the motor at a predetermined rate of increase while keeping the motor stopped.

20 Claims, 6 Drawing Sheets

(51) Int. Cl.
*H02P 29/68* (2016.01)
*H02M 1/14* (2006.01)

(56) References Cited

U.S. PATENT DOCUMENTS

| | | | |
|---|---|---|---|
| 9,467,068 B2 * | 10/2016 | Yamagami | H02M 7/53871 |
| 9,698,712 B2 * | 7/2017 | Nagata | H02P 6/157 |
| 2002/0085397 A1 * | 7/2002 | Suzui | H02J 3/381 |
| | | | 363/37 |
| 2015/0295490 A1 * | 10/2015 | Yamagami | H02M 1/36 |
| | | | 363/49 |

FOREIGN PATENT DOCUMENTS

| | | |
|---|---|---|
| JP | 2012-222925 A | 11/2012 |
| JP | 2013-242110 A | 12/2013 |
| JP | 2014-107897 A | 6/2014 |
| JP | 2019-009940 A | 1/2019 |
| KR | 10-1323921 B1 | 10/2013 |

\* cited by examiner

FIG. 4

| AMBIENT TEMPERATURE Tc [°C] | INPUT VOLTAGE HV [V] | | | | | | |
|---|---|---|---|---|---|---|---|
| | <200 | <250 | <300 | <350 | <400 | <450 | <500 |
| 6≤ | 10/10 | 10/10 | 10/10 | 10/10 | 10/10 | 10/10 | 10/10 |
| 1~5 | 10/10 | 10/10 | 10/10 | 10/10 | 10/10 | 10/10 | 10/10 |
| -4~0 | 10/10 | 10/10 | 10/10 | 10/10 | 10/10 | 5/10 | 5/10 |
| -9~-5 | 10/10 | 10/10 | 10/10 | 10/10 | 5/10 | 5/10 | 3/10→7/10 [t1] |
| -14~-10 | 10/10 | 10/10 | 10/10 | 5/10 | 5/10 | 3/10→7/10 [t1] | 2/10→6/10 [t2] |
| -19~-15 | 10/10 | 10/10 | 5/10 | 5/10 | 3/10→7/10 [t1] | 2/10→6/10 [t2] | 2/10→6/10 [t3] |
| -24~-20 | 10/10 | 5/10 | 5/10 | 3/10→7/10 [t1] | 2/10→6/10 [t2] | 2/10→6/10 [t3] | 2/10→6/10 [t4] |
| -29~-25 | 3/10→7/10 [t1] | 3/10→7/10 [t1] | 2/10→6/10 [t2] | 2/10→6/10 [t3] | 2/10→6/10 [t4] | 2/10→6/10 [t5] | 1/10→5/10 [t5] |
| -34~-30 | 3/10→7/10 [t1] | 3/10→7/10 [t1] | 2/10→6/10 [t2] | 2/10→6/10 [t3] | 1/10→5/10 [t4] | 1/10→5/10 [t5] | 1/10→2/10→2/10→5/10 [t6-t7] |
| -39~-35 | 2/10→6/10 [t2] | 2/10→6/10 [t2] | 2/10→6/10 [t3] | 2/10→6/10 [t4] | 1/10→5/10 [t5] | 1/10→5/10 [t5] | 1/10→2/10→2/10→5/10 [t6-t7] |

INVERTER DEVICE

CROSS-REFERENCE TO RELATED APPLICATIONS

This application is a U.S. National Stage Patent Application under 35 U.S.C. § 371 of International Patent Application No. PCT/JP2020/016358, filed on Apr. 14, 2020, which claims the benefit of Japanese Patent Application No. 2019-087414, filed on May 7, 2019, the disclosures of each of which are incorporated herein by reference in their entirety.

TECHNICAL FIELD

The present invention relates to an inverter device which generates an AC voltage from a DC voltage smoothed by an electrolytic capacitor to drive an electric motor.

BACKGROUND ART

A conventional inverter device of this type selectively drives three switching elements on the upper phase side of an inverter circuit and three switching elements on the lower phase side thereof to thereby generate three-phase voltages of U, V, and W from a DC voltage to drive an electric motor. The inverter device is provided with an electrolytic capacitor which smooths a power supply voltage of the inverter circuit.

Further, in such an inverter device, particularly an in-vehicle inverter device may be used in a low temperature environment. There is a risk that when an electrolytic capacitor is used under such an environment, an internal resistance component (equivalent series resistance) of the electrolytic capacitor rises to increase a ripple voltage, and the voltage applied to the electrolytic capacitor will exceed its breakdown voltage or become a reverse voltage, thus leading to its destruction.

As a measure to solve this, it is conceivable to increase the number of electrolytic capacitors and reduce the internal resistance component to lower the ripple voltage. A problem however arises in that costs rise and upsizing occurs. Therefore, as a method of reducing the internal resistance component, there has been developed a method of executing a warming up mode in which the internal temperature of the electrolytic capacitor is raised while keeping the electric motor stopped (refer to, for example, Patent Document 1).

CITATION LIST

Patent Documents

Patent Document 1: Japanese Patent Application Laid-Open No. 2012-222925

SUMMARY OF THE INVENTION

Problems to be Solved by the Invention

Here, in order to reduce the internal resistance component of the electrolytic capacitor to lower the ripple voltage, it is ideal to raise the internal temperature of the electrolytic capacitor over a long period of time with a small current. However, such a conventional method was accompanied by a problem that a time for the warming up mode, that is, a non-operating time from the start instruction of the electric motor until the electric motor starts to rotate became long.

The present invention has been made to solve the above-mentioned conventional technical problems, and an object thereof is to provide an inverter device capable of more quickly raising an internal temperature of an electrolytic capacitor within a permissible range of a ripple voltage and shortening a non-operating time.

Means for Solving the Problems

An inverter device of the present invention includes an electrolytic capacitor which smooths an input voltage to generate a DC voltage, an inverter circuit which generates an AC voltage from the DC voltage to drive an electric motor, a temperature sensor which detects a temperature of the electrolytic capacitor or an ambient temperature thereof, and a control device which controls the drive of a plurality of switching elements included in the inverter circuit. The inverter device is characterized in that in the case where the temperature detected by the temperature sensor is lower than a predetermined temperature, the control device on-drives specific switching elements selected out of the switching elements before starting a normal operation of the electric motor to thereby execute a warming up operation of allowing a current capable of controlling a ripple voltage of the DC voltage within a permissible range to flow through the electric motor at a predetermined rate of increase while keeping the electric motor stopped.

The inverter device of the invention of a particular embodiment is characterized in that in the above invention, the control device changes a rate of increase in the current flowing through the electric motor, based on the input voltage and the temperature detected by the temperature sensor.

The inverter device of the invention of a particular embodiment is characterized in that in the above invention, the control device changes the rate of increase in the current flowing through the electric motor in a direction to lower the rate of increase in the current as the input voltage is higher.

The inverter device of the invention of a particular embodiment is characterize in that in the above invention, the control device changes the value of the current flowing through the electric motor in a direction to lower the value of the current at the start of the warming up operation as the input voltage is higher.

The inverter device of the invention of a particular embodiment is characterized in that in the inventions of other embodiments, the control device changes the rate of increase in the current flowing through the electric motor in a direction to lower the rate of increase in the current as the temperature detected by the temperature sensor is lower.

The inverter device of the invention of a particular embodiment is characterized in that in the above invention, the control device changes the value of the current flowing through the electric motor in a direction to lower the value of the current at the start of the warming up operation as the temperature detected by the temperature sensor is lower.

The inverter device of the invention of a particular embodiment is characterized in that in the above respective inventions, the control device changes the rate of increase in the current flowing through the electric motor in multiple stages according to the passage of time in the warming up operation.

The inverter device of the invention of a particular embodiment is characterized in that in the above invention, the control device changes the rate of increase in the current flowing through the electric motor in a direction to increase the rate of increase in the current as time elapses from the start of the warming up operation.

The inverter device of the invention of a particular embodiment is characterized in that in the above respective inventions, the control device limits the value of the current flowing through the electric motor in the normal operation after the completion of the warming up operation.

Advantageous Effect of the Invention

An inverter device of the present invention includes an electrolytic capacitor which smooths an input voltage to generate a DC voltage, an inverter circuit which generates an AC voltage from the DC voltage to drive an electric motor, a temperature sensor which detects a temperature of the electrolytic capacitor or an ambient temperature thereof, and a control device which controls the drive of a plurality of switching elements included in the inverter circuit. In the case where the temperature detected by the temperature sensor is lower than a predetermined temperature, the control device on-drives specific switching elements selected out of the switching elements before starting a normal operation of the electric motor to thereby execute a warming up operation of allowing a current capable of controlling a ripple voltage of the DC voltage within a permissible range to flow through the electric motor at a predetermined rate of increase while keeping the electric motor stopped. It is therefore possible to more quickly raise an internal temperature of the electrolytic capacitor while suppressing the ripple voltage of the DC voltage within the permissible range.

Thus, it is possible to shorten the time for the warm-up operation (non-operating time) required from the start instruction until the electric motor starts to rotate, while avoiding the destruction of the electrolytic capacitor in a low temperature environment.

In this case, the peak value of the ripple voltage becomes larger as the input voltage is higher and the temperature of the electrolytic capacitor is lower. Therefore, as in the invention of a particular embodiment, the control device changes a rate of increase in the current flowing through the electric motor, based on the input voltage and the temperature detected by the temperature sensor. Thus, it is possible to safely and effectively raise the internal temperature of the electrolytic capacitor with the warming up operation.

For example, as in the invention of a particular embodiment, the control device changes the rate of increase in the current flowing through the electric motor in a direction to lower the rate of increase in the current as the input voltage is higher. Thus, it is possible to safely and promptly raise the internal temperature of the electrolytic capacitor by the warming up operation.

In this case, as in the invention of a particular embodiment, the control device changes the value of the current flowing through the electric motor in a direction to lower the value of the current at the start of the warming up operation as the input voltage is higher. Thus, it is possible to more effectively avoid the destruction of the electrolytic capacitor due to the ripple voltage of the DC voltage.

Further, for example, as in the invention of a particular embodiment, the control device changes the rate of increase in the current flowing through the electric motor in a direction to lower the rate of increase in the current as the temperature detected by the temperature sensor is lower. Even in this case, it is possible to safely and promptly raise the internal temperature of the electrolytic capacitor by the warming up operation.

Also in this case, as in the invention of a particular embodiment, the control device changes the value of the current flowing through the electric motor in a direction to lower the value of the current at the start of the warming up operation as the temperature detected by the temperature sensor is lower. Thus, it is possible to effectively avoid the destruction of the electrolytic capacitor due to the ripple voltage of the DC voltage.

Here, the internal resistance component of the electrolytic capacitor has a tendency to he extremely large at a low temperature and to decrease sharply as the internal temperature rises. Therefore, as in the invention of a particular embodiment, the control device changes the rate of increase in the current flowing through the electric motor in multiple stages according to the passage of time in the warming up operation. For example, as in the invention of claim 8, the control device changes the rate of increase in the current flowing through the electric motor in a direction to increase the rate of increase in the current as time elapses from the start of the warming up operation. Thus, it is possible to more safely and promptly raise the internal temperature of the electrolytic capacitor.

Further, if the control device limits the value of the current flowing through the electric motor in the normal operation after the completion of the warming up operation as in the invention of claim 9, it is possible to more effectively avoid the destruction of the electrolytic capacitor in the low temperature environment.

BRIEF DESCRIPTION OF THE DRAWINGS

FIG. 4 is a diagram describing warming up operation conditions used in the flowchart of FIG. 2;

MODE FOR CARRYING OUT THE INVENTION

Figure 1:
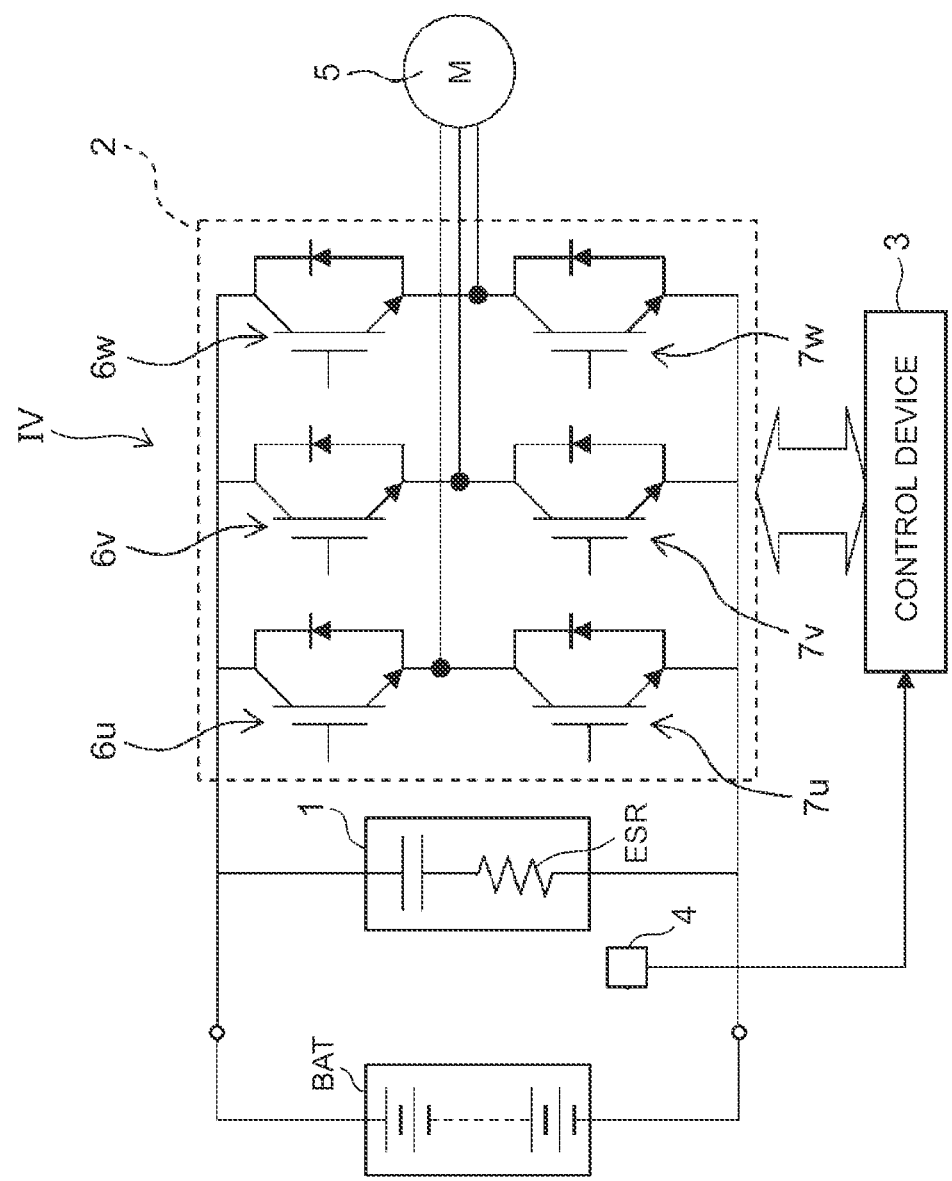
FIG. 1 is a schematic electric circuit diagram of an inverter device of an embodiment to which the present invention is applied.

Hereinafter, embodiments of the present invention will be described in detail with reference to the drawings. FIG. 1 is an electric circuit diagram showing a schematic configuration of an inverter device IV of an embodiment to which the present invention is applied. The inverter device IV of the embodiment is an in-vehicle inverter device which is provided integrally with an unillustrated compressor constituting an air conditioning device for a vehicle and is mounted on the vehicle. The inverter device IV of the embodiment is that an input voltage HV from a battery (DC power supply) BAT mounted on the vehicle is smoothed by an electrolytic capacitor 1, and an AC voltage is generated from the smoothed DC voltage to drive a motor 5 as an electric motor. The inverter device IV is configured to include the electrolytic capacitor 1, an inverter circuit 2, a control device 3, and a temperature sensor 4.

The electrolytic capacitor 1 smooths the input voltage HV to a DC voltage, and is comprised of a large-capacity aluminum electrolytic capacitor. Such an aluminum electrolytic capacitor is small in size and inexpensive, but generally has a large internal resistance component (equivalent series resistance) ESR because the resistance of electrolytic solution, the resistance of electrolytic paper, and the like exist. Further, the electrolytic capacitor has a feature that as in the case where used under a low temperature environment, for example, the lower the internal temperature of the electrolytic capacitor 1, the larger the internal resistance component ESR, and in particular, the lower the internal temperature, the sharper the internal resistance component ESR increases.

The inverter circuit 2 is provided so that the DC voltage smoothed by the electrolytic capacitor 1 as described above is supplied as a power supply voltage. The inverter circuit 2 generates three-phase voltages Vu, Vv, and Vw from the DC voltage and supplies them to the motor (three-phase brushless motor) 5 as an electric motor. The inverter circuit 2 is configured to include, for example, three switching elements (IGBT) 6u, 6v, and 6w on the upper phase side, and three switching elements (IGBT) 7u, 7v, and 7w on the lower phase side.

Then, the control device 3 is provided by connecting to the inverter circuit 2. The control device 3 is comprised of a microcomputer having a processor, and controls on/off drive of the six switching elements 6u to 6w and 7u to 7w of the inverter circuit 2 to operate the motor 5 appropriately. The control device 3 is configured so that when the temperature of the electrolytic capacitor 1 is lower than a predetermined temperature T1 fixed in advance, the duty ratio of a pulse width modulated (hereinafter called "PWM") signal to on/off-drive the respective switching elements 6u to 6w and 7u to 7w of the inverter circuit 2 is controlled before the normal operation of the motor 5 is started, thereby to feed to the motor 5, a current (phase current) limited such that a ripple voltage of the DC voltage applied to the electrolytic capacitor 1 is within a permissible range, and enable execution of a warming up operation of raising the temperature of the electrolytic capacitor 1 by Joule heat generated in the internal resistance component (equivalent series resistance) ESR of the electrolytic capacitor 1 while keeping the motor 5 stopped.

In this case, in the warming up operation, the control device 3 causes the current to flow through the motor 5 with a predetermined rate of increase, and in the embodiment, changes its rate of increase, based on the input voltage HV from the battery BAT and the ambient temperature of the electrolytic capacitor 1. In the embodiment, the temperature sensor 4 is provided in the vicinity of the electrolytic capacitor 1. The temperature sensor 4 detects the ambient temperature Tc (temperature around the electrolytic capacitor 1) of the electrolytic capacitor 1 and outputs the same to the control device 3. The temperature sensor 4 is comprised of, for example, a thermocouple or a positive characteristic thermistor or the like.

Incidentally, in the embodiment, the electrolytic capacitor 1 is mounted on the same substrate as the inverter circuit 2 and accommodated in the same space as the inverter circuit 2. The temperature sensor 4 is also arranged on the substrate in the vicinity of the electrolytic capacitor 1, but not limited thereto. The temperature of the electrolytic capacitor 1 itself may be detected by the temperature sensor 4. In the embodiment, the ambient temperature Tc of the electrolytic capacitor 1 is assumed to be treated as the temperature of the electrolytic capacitor 1.

Further, the warming up operation conditions shown in FIG. 4 are preset to the control device 3. The warming up operation conditions of the embodiment are a data table set based on the ambient temperature Tc of the electrolytic capacitor 1 detected by the temperature sensor 4 and the input voltage HV from the battery BAT. In this case, under the warming up operation conditions of FIG. 4, the parts shown only in $^{10}/_{10}$ and $^{5}/_{10}$ means that the warming up operation is not executed. Incidentally, it means that $^{10}/_{10}$ is the value of a normal starting current, and $^{5}/_{10}$ is half the value.

Further, in the figure, t1 to t7 each indicate the energization time to the motor 5, and the parts indicated by the fractions connected by each arrow basically indicate a current value at the start of the warming up operation of the motor 5 and a current value at the completion thereof respectively. It means that the warming up operation is performed at the part where these are shown. The fraction is similarly the magnitude of the current value with respect to the normal starting current ($^{10}/_{10}$), for example, $^{2}/_{10}$ means that it is one fifth of the normal starting current ($^{10}/_{10}$).

Further, the energization times t1 to t5 in FIG. 4 have a relationship of t1<t2<t3<t4<t5. Incidentally, the energization times t6 and t7 have a relationship of t7<t6 in the embodiment. Then, the longer the energization time and the smaller the difference between the current value at the start of the warming up operation and the current value at completion thereof, the lower the rate of increase in current. The shorter the energization time and the larger the difference between the current value at the start of the warming up operation and the current value at completion thereof, the higher the rate of increase in current.

Each of the energization times t1 to t7, the current value at the start of the warming up operation and the current value at the completion thereof ($^{1}/_{10}$, $^{2}/_{10}$, $^{3}/_{10}$, $^{5}/_{10}$, $^{6}/_{10}$, $^{7}/_{10}$), and the rate of increase in the current determined from, i.e., those are the energization time, the current value, and the increase rate capable of suppressing the ripple voltage of the DC voltage in the electrolytic capacitor 1 within the permissible range under the condition of the combination of each ambient temperature Tc and the input voltage HV. They are assumed to be determined in advance by experiment. Then, when performing the warming up operation, the control device 3 selects one of the conditions from the ambient temperature Tc and the input voltage HV when the start instruction of the motor 5 is input, and executes the warming up operation of the electrolytic capacitor 1.

Next, the warming up operation executed by the control device 3 will be specifically described with reference to the flowchart of FIG. 2. When there is an instruction to start the motor 5, the control device 3 first determines in step S1 of the flowchart of FIG. 2, whether or not the ambient temperature Tc of the electrolytic capacitor 1 detected by the temperature sensor 4 is lower than the predetermined temperature T1. However, in the embodiment, the predetermined temperature T1 differs depending on the input voltage HV. That is, the peak value of the ripple voltage of the DC voltage applied to the electrolytic capacitor 1 becomes larger as the input voltage HV is higher and the temperature of the electrolytic capacitor 1 (in the embodiment, the ambient temperature Tc is adopted) is lower.

Therefore, in this embodiment, when the input voltage HV is lower than 200V, the predetermined temperature T1 is set to −24° C. When the input voltage HV is 200V or higher and lower than 250V, the predetermined temperature T1 is set to −19° C. When the input voltage HV is 250V or higher and lower than 300V, the predetermined temperature T1 is set to −14° C. Similarly, when the input voltage HV is 300V or higher and lower than 350V, the predetermined temperature T1 is set to −9° C. When the input voltage HV is 350V or higher and lower than 400V, the predetermined temperature T1 is set to −4° C. Further, when the input voltage HV is 400V or higher and lower than 450V, the predetermined temperature T1 is set to +1° C. When the input voltage HV is 450V or higher and lower than 500V the predetermined temperature T1 is set to +6° C.

When the ambient temperature Tc of the electrolytic capacitor 1 detected by the temperature sensor 4 in step S1 is equal to or higher than the predetermined temperature T1, the control device 3 proceeds to step S7 to start the motor 5 with the above-mentioned normal starting current ($^{10}/_{10}$), thus starting the normal operation. That is, the warming up operation of the electrolytic capacitor 1 before the normal operation of the motor 5 is not performed.

On the other hand, when the ambient temperature Tc is lower than the predetermined temperature T1 in step S1, the control device proceeds to step S2 to determine whether or not an elapsed time tpass after the completion of the previous warming up operation is shorter than a predetermined time tpass1. When the predetermined time tpass1 or more has elapsed after the completion of the previous warming up operation, the control device 3 proceeds to step S6.

When the elapsed time tpass after the completion of the previous warming up operation is shorter than the predetermined time tpass1, the control device 3 proceeds to step S3 to check the input voltage HV from the battery BAT. Next, the control device proceeds to step S4 to check the warming up operation conditions in FIG. 4 from the ambient temperature Tc and the input voltage HV thereby selecting and determining any of the warming up operation conditions to start the warming up operation of the electrolytic capacitor 1.

Figure 3:
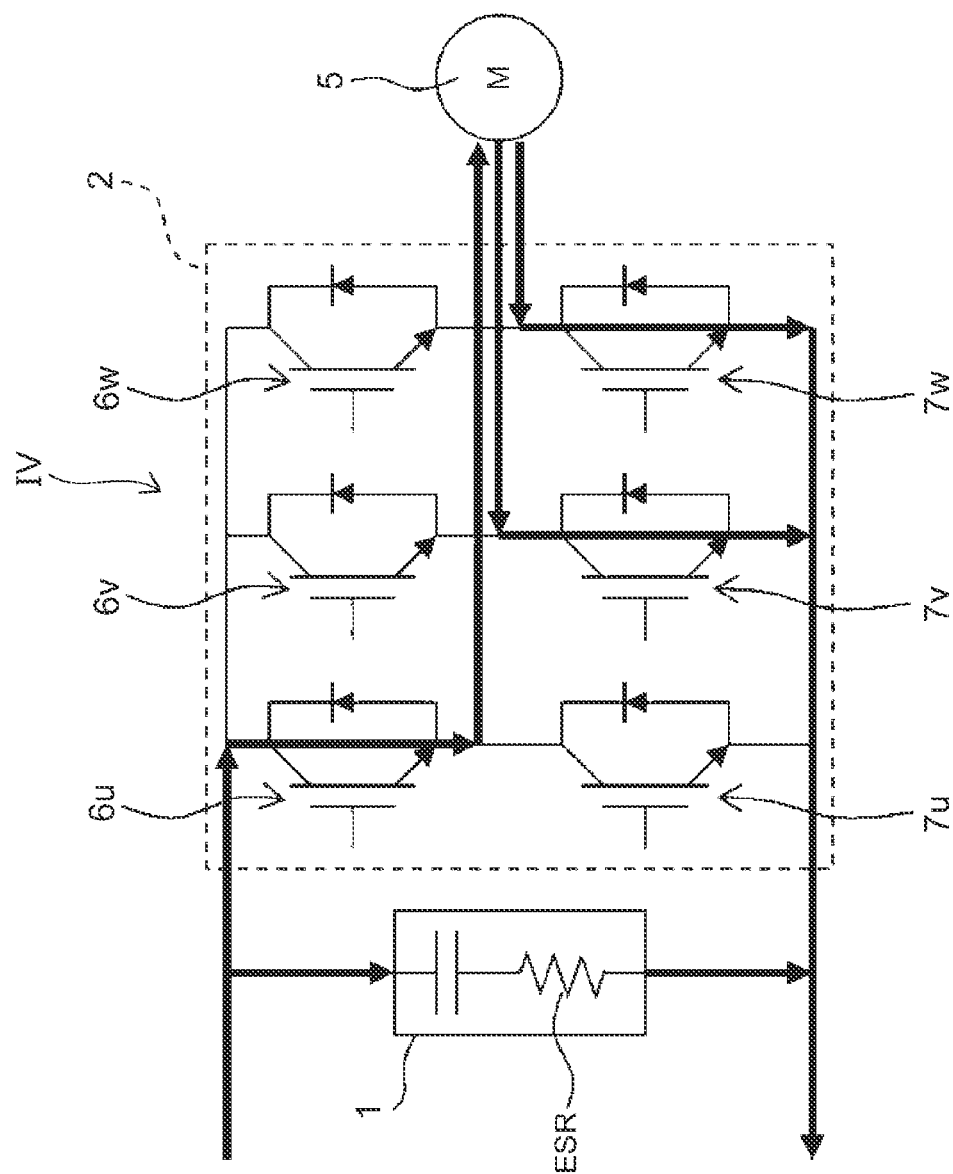
FIG. 3 is a diagram describing an energization state of an inverter circuit in the warming up operation of FIG. 2.

In the warming up operation, the control device 3 calculates the duty ratio of the PWM signal, based on the determined warming up operation conditions. Then, in accordance with the PWM signal with the calculated duty ratio, for example, the switching element 6u on the upper phase side of the inverter circuit 2 is on-driven, and for example, the switching elements 7v and 7w on the lower phase side are on-driven. Consequently, as shown by a thick solid line in FIG. 3, a current under the warming up operating condition determined so that the ripple voltage of the DC voltage falls within the permissible range flows through the inverter circuit 2 and the motor 5 to execute the warming up operation.

In this case, since the on-driven switching elements of the inverter circuit 2 are fixed to, for example, the switching element 6u on the upper phase side and, for example, the switching elements 7v and 7w on the lower phase side, the motor 5 remains stopped. While the current is being applied to the motor 5 in this manner, the electrolytic capacitor 1 is heated by Joule heat generated in its internal resistance component ESR to raise the temperature.

(1) Warming Up Operation (Part 1)

Next, an example of actual warming up operation under each warming up operation condition in FIG. 4 will be described. As described above, the peak value of the ripple voltage of the DC voltage applied to the electrolytic capacitor 1 becomes larger as the input voltage HV is higher and the temperature of the electrolytic capacitor 1 (the ambient temperature Tc is adopted in the embodiment) is lower. Thus, when the input voltage HV is 200V or higher and lower than 300V in a situation where the ambient temperature Tc of the electrolytic capacitor 1 is −24° C. or higher and −20° C. or lower, the control device 3 sets the current value flowing through the motor 5 to $^{5}/_{10}$ (constant value). This is a current value which is half the normal starting current ($^{10}/_{10}$).

Also, even when the input voltage HV is 250V or higher and lower than 350V in a situation where the ambient temperature Tc is −19° C. or higher and −15° C. or lower, the current value to flow through the motor 5 is similarly set to $^{5}/_{10}$. Further, even when the input voltage HV is 300V or higher and lower than 400V in a situation where the ambient temperature Tc is −14° C. or higher and −10° C. or lower, the current value to flow through the motor 5 is similarly set to $^{5}/_{10}$. In addition, even when the input voltage is 350V or higher and lower than 450V in a situation where the ambient temperature Tc is −9° C. or higher and −5° C. or lower, the current value to flow through the motor 5 is similarly set to $^{5}/_{10}$. Furthermore, even when the input voltage HV is 400V or higher and lower than 500V in a situation where the ambient temperature Tc is −4° C. or higher and 0° C. or lower, the current value to flow through the motor 5 is similarly set to $^{5}/_{10}$. Still further, even when the input voltage HV is 450V or higher and lower than 500V in a situation where the ambient temperature Tc is +1° C. or higher and +5° C. or lower, the current value to flow through the motor 5 is similarly to $^{5}/_{10}$.

Thus, in a situation where the ambient temperature Tc is relatively high, the constant current ($^{5}/_{10}$) being half the value of the normal starting current ($^{10}/_{10}$) is made to flow through the motor 5 at the low ambient temperature Tc as the input voltage HV is lower, and at the high ambient temperature Tc as the input voltage HV is higher, whereby the warming up operation of the electrolytic capacitor 1 is executed while controlling the ripple voltage of the DC voltage applied to the electrolytic capacitor 1 within the permissible range.

(2) Warming Up Operation (Part 2)

Next, as shown in FIG. 4, when the input voltage HV is lower than 300V in a situation where the ambient temperature Tc is −25° C. or lower, when the input voltage HV is 300V or higher and lower than 350V in a situation where the ambient temperature Tc is −24° C. or higher and −20° C. or lower, when the input voltage HV is 350V or higher and lower than 400V in a situation where the ambient temperature Tc is −19° C. or higher and −15° C. or lower, when the input voltage HV is 400V or higher and lower than 450V in a situation where the ambient temperature Tc is −14° C. or higher and −10° C. or lower, and when the input voltage HV is 450V or higher and lower than 500V in a situation where the ambient temperature Tc is −9° C. or higher and −5° C. or lower, the control device 3 performs a warming up operation of increasing the current to flow through the motor 5 at a predetermined rate of increase.

Figure 5:
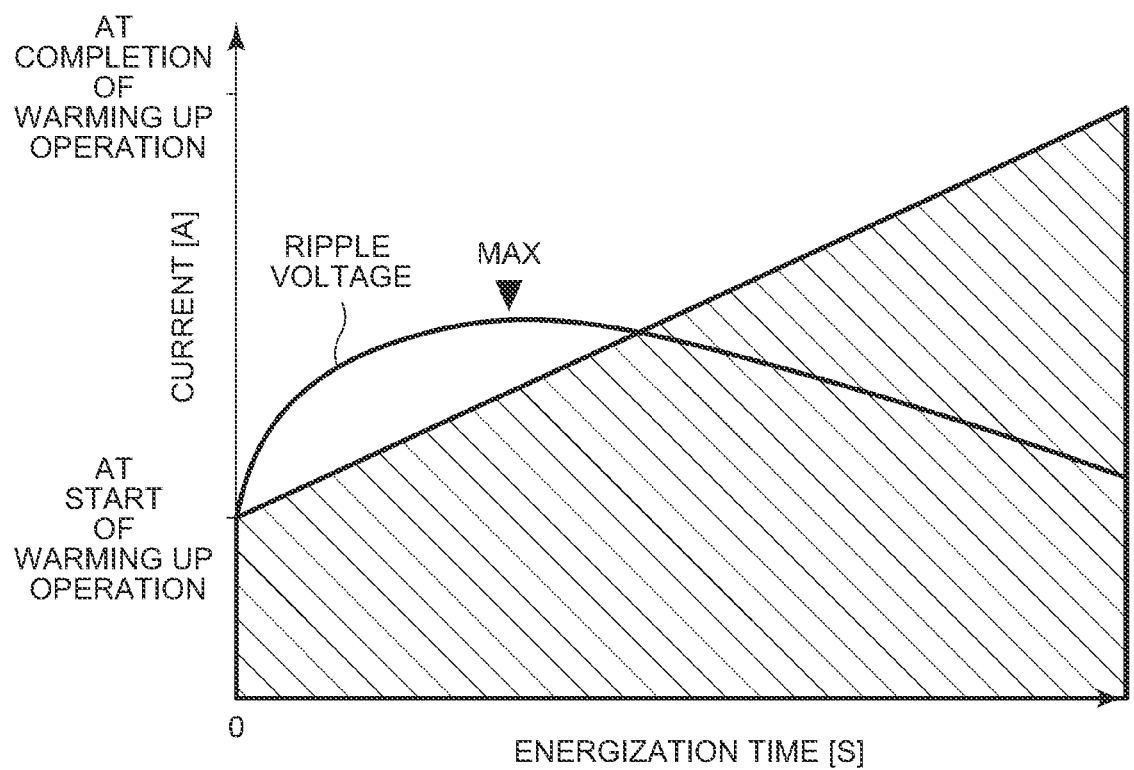
FIG. 5 is a diagram describing an example of the warming up operation executed in the flowchart of FIG. 2.

For example, when the input voltage HV is lower than 200V in a situation where the ambient temperature Tc is −29° C. or higher and −25° C. or lower, the current value at the start of the warming up operation is set to $^{3}/_{10}$ (three tenths of the normal starting current), the current value at the time of its completion is set to $^{7}/_{10}$ (seven tenths of the normal starting current), and the energization time is set to t1. Thus, as shown in FIG. 5, a current flows through the motor 5 at a rate of increase at which it rises from $^{3}/_{10}$ to $^{7}/_{10}$ during the time t1. In this case, the ripple voltage of the DC voltage in the electrolytic capacitor 1 rises from the start of the warming up operation, but the internal resistance component ESR decreases as the internal temperature of the electrolytic capacitor 1 rises, so that MAX (maximum value)

is reached at a certain point, and thereafter it will gradually decrease even if the current increases. Further, by increasing the current to flow through the motor 5 at the rate of increase as shown in FIG. 5, the internal temperature of the electrolytic capacitor 1 can be increased earlier than when a constant current is made to flow.

On the other hand, similarly, even when the input voltage HV is lower than 200V, in a situation where the ambient temperature Tc is −39° C. or higher and −35° C. or lower, the current value at the start of the warming up operation is set to $2/10$ (two tenths of the normal starting current), the current value at the completion thereof is set to $6/10$ (six tenths of the normal starting current), and the energization time is set to t2. The difference between the current value $2/10$ at the start of the warming up operation and the current value $6/10$ at the completion in this case is the same as the difference (difference between $3/10$ and $7/10$) when the ambient temperature Tc is −29° C. or higher and −25° C. or lower. However, since the energization time t2 is longer than t1 as described above, the rate of increase in current from the start to the completion of the warming up operation becomes lower than that when the ambient temperature Tc is −29° C. or higher and −25° C. or lower. That is, even with the same input voltage HV, as the ambient temperature Tc becomes lower, the control device 3 changes the rate of increase in the current in the warming up operation to the direction to lower the rate of increase in the current.

Also, the current value to flow through the motor 5 at the start of the warming up operation is also lowered to $2/10$ when the ambient temperature Tc is −39° C. or higher and −35° C. or lower as compared to $3/10$ when the ambient temperature Tc is −29° C. or higher and −25° C. or lower. That is, even with the same input voltage HV, as the ambient temperature Tc becomes lower, the control device 3 changes the current value at the start of the warming up operation to the direction to lower it.

Further, similarly, even in the situation where the ambient temperature Tc is −29° C. or higher and −25° C. or lower, for example, when the input voltage HV is 450V or higher and lower than 500V, the current value at the start of the warming up operation is set to $1/10$ (one tenths of the normal starting current), the current value at the time of its completion is set to $5/10$ (five tenths of the normal starting current), and the energization time is set to t5. The difference between the current value $1/10$ at the start of the warming up operation and the current value $5/10$ at the completion in this case is the same as the difference (difference between $3/10$ and $7/10$) when the input voltage HV is lower than 200V. However, since the energization time t5 is longer than t1 as described above, the rate of increase in current from the start to the completion of the warming up operation becomes lower than that when the input voltage HV is lower than 200V. That is, even with the same ambient temperature Tc, as the input voltage HV becomes higher, the control device 3 changes the rate of increase in the current in the warming up operation to the direction to lower the rate of increase in the current.

Also, the current value to flow through the motor 5 at the start of the warming up operation is also lowered to $1/10$ when the input voltage HV is 450V or higher and lower than 500V as compared to $3/10$ when the input voltage is lower than 200V. That is, even with the same ambient temperature Tc, as the input voltage HV becomes higher, the control device 3 changes the current value at the start of the warming up operation to the direction to lower it.

A similar tendency is shown even under the warming up operation conditions at the other ambient temperatures Tc and the input voltages HV in FIG. 4. Even with the same input voltage HV, the control device 3 changes the current value at the start of the warming up operation to the direction to lower it as the ambient temperature Tc becomes lower. Even with the same ambient temperature Tc, as the input voltage HV becomes higher, the control device 3 changes the current value at the start of the warming up operation to the direction to lower it.

Figure 2:
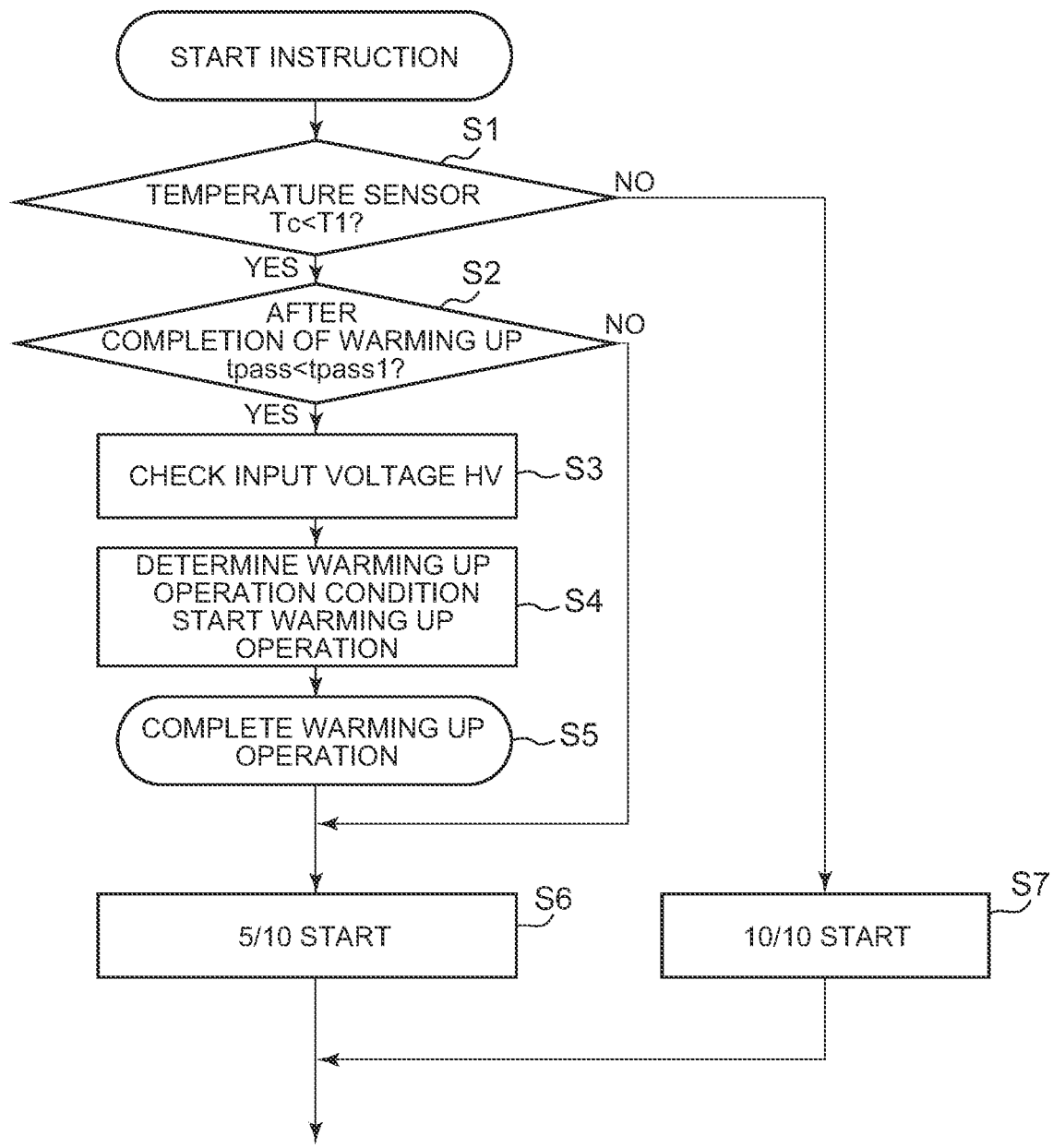
FIG. 2 is a flowchart describing a warming up operation of a control device of the inverter device of FIG. 1.

When the warming up operation is completed in step S5 of FIG. 2, the control device 3 proceeds to step S6 and starts the motor 5 with the starting current of $5/10$, which is half of the normal starting current ($10/10$) described above, thereby starting the normal operation. That is, after the warming up operation is completed, the control device 3 limits the value of the current flowing through the motor 5 from the normal value ($10/10$) to ($5/10$).

Thus, when the ambient temperature Tc detected by the temperature sensor 4 is lower than the predetermined temperature T1, the control device 3 on-drives the specific switching elements 6u, 7v, and 7w selected out of the plurality of switching elements 6u to 6w and 7u to 7w before starting the normal operation of the motor 5 to thereby perform the warming up operation of applying the current that can control the ripple voltage of the DC voltage within the permissible range to the motor 5 at a predetermined rate of increase while keeping the motor 5 stopped. It is therefore possible to raise the internal temperature of the electrolytic capacitor 1 more quickly while suppressing the ripple voltage of the DC voltage within the permissible range.

Consequently, it becomes possible to shorten the warming up operation time (non-operating time) required from the start instruction to the start of rotation of the motor 5 while avoiding the destruction of the electrolytic capacitor 1 under a low temperature environment.

Further, in the embodiment, since the control device 3 changes the rate of increase in the current flowing through the motor 5 based on the input voltage HV and the ambient temperature Tc detected by the temperature sensor 4, it becomes possible to raise the internal temperature of the electrolytic capacitor 1 more safely and effectively with the warming up operation.

In this case, in the embodiment, since the control device 3 changes the rate of increase in the current flowing through the motor 5 to the direction to lower it as the input voltage HV becomes higher, it is possible to raise the internal temperature of the electrolytic capacitor 1 safely and promptly by the warming up operation.

Further, in the embodiment, since the control device 3 changes the value of the current flowing through the motor 5 at the start of the warming up operation in the direction to lower the value as the input voltage HV is higher, it is possible to more effectively avoid the destruction of the electrolytic capacitor 1 due to the ripple voltage of the DC voltage.

In addition, in the embodiment, since the control device 3 changes the rate of increase in the current flowing through the motor 5 in the direction to lower it as the ambient temperature Tc detected by the temperature sensor 4 is lower, it is possible to raise the internal temperature of the electrolytic capacitor 1 safely and promptly by the warming up operation.

Also in this case, in the embodiment, since the control device 3 changes the value of the current flowing through the motor 5 at the start of the warming up operation in the direction to lower it as the ambient temperature Tc detected by the temperature sensor 4 is lower, it is possible to effectively avoid the destruction of the electrolytic capacitor 1 due to the ripple voltage of the DC voltage.

Then, in the embodiment, since the control device 3 limits the value of the current flowing through the motor 5 in the normal operation after the warming up operation is completed, it is possible to more effectively avoid the destruction of the electrolytic capacitor 1 under the low temperature environment.

(3) Warming Up Operation (part 3)

Further, in an extremely harsh environment, that is, in a situation where the ambient temperature Tc is extremely low and the input voltage HV is also extremely high, the control device 3 changes the rate of increase in the current during the warming up operation stepwise according to the passage of time. This example is shown as the warming up operation condition in the lower right corner of FIG. 4. That is, when the ambient temperature Tc of the electrolytic capacitor 1 detected by the temperature sensor 4 is −30° C. or lower and the input voltage HV from the battery BAT is 450V or higher and smaller than 500V, in the warming up operation started in step S4 of FIG. 2, the control device 3 first sets the current value at the start of the warming up operation to $1/10$ (one tenth of the normal starting current), and sets the current value when the time t6 has elapsed from the start to $2/10$ (two tenths of the normal starting current), and starts energization to the motor 5. Thereafter, the control device sets the current value at the completion of the warming up operation in which the time t7 has elapsed since the time t6 has elapsed to $5/10$ (five tenths of the normal starting current) to switch the current to the state of energizing.

Figure 6:
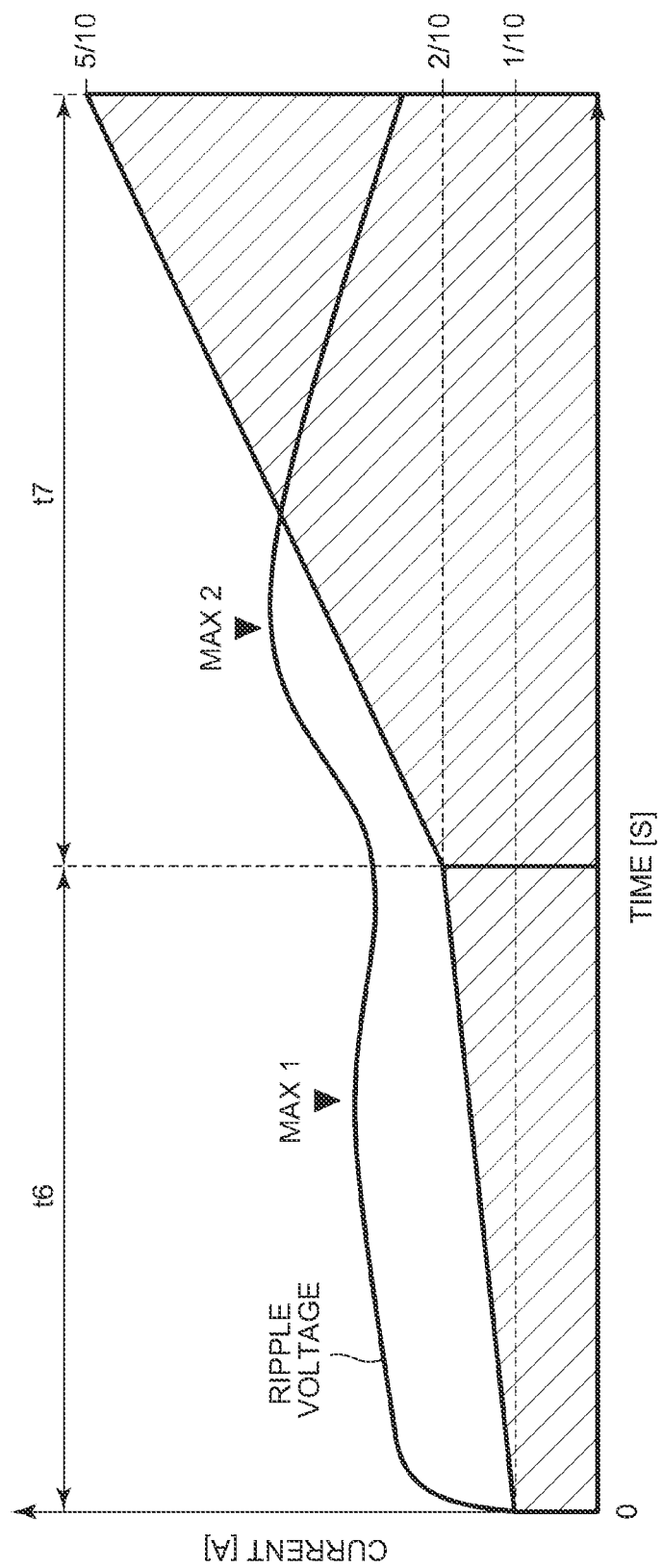
FIG. 6 is a diagram describing another example of the warming up operation executed in the flowchart of FIG. 2.

Thus, as shown in FIG. 6, a current flows through the motor 5 at an increase rate rising from $1/10$ to $2/10$ during the energization time t6 from the start of the warming up operation until the time t6 elapses. From the time when the time t6 elapses until the time 7 further elapses, the current flows at an increase rate rising from $2/10$ to $5/10$ during the energization time t7. Here, in the embodiment as described above, the energization time t6 is longer than t7, and the difference in current from the elapse of the time t6 until the time t7 elapses is larger than the difference in current from the start to the elapse of the time t6. Therefore, the rate of increase in the current from the start until the time t6 elapses is low, and then the rate of increase in the current until the time t7 elapses becomes high. Incidentally, if the gradual change in the rate of increase is ensured, the magnitude relationship between the energization times t6 and t7 is not limited to the embodiment.

Here, the internal resistance component ESR of the electrolytic capacitor 1 is extremely large at a low temperature and has a tendency to decrease sharply as the internal temperature rises. Therefore, although the ripple voltage of the DC voltage in the electrolytic capacitor 1 rises from the start of the warming up operation of FIG. 6, the rate of increase in the current until the time t6 elapses is small, and the internal resistance component ESR also drops sharply as the internal temperature of the electrolytic capacitor 1 rises, so that MAX1 (maximum value 1) of the ripple voltage becomes relatively low within the permissible range.

Further, after the time t6 elapses, the rate of increase in the current until the time t7 elapses and the warming up operation is completed further increases, but at that time, the internal resistance component ESR of the electrolytic capacitor 1 is lowered remarkably. Therefore, the ripple voltage does not exceed another MAX2 (maximum value 2) within the permissible range. Thereafter, the ripple voltage gradually decreases even if the current increases. Thus, in an environment where the ambient temperature Tc and the input voltage HV are extremely severe, the control device 3 changes the rate of increase in the current flowing through the motor 5 in multiple stages (two stages in the embodiment) according to the passage of time in the warming up operation. Further, the control device 3 changes the rate of increase in the current flowing through the motor 5 in the direction of increasing as the time elapses from the start of the warming up operation. It is therefore possible to more safely and quickly raise the internal temperature of the electrolytic capacitor 1.

Incidentally, the time axis shown in FIG. 6 is not constant, and in order to exaggerate the image, the image is reduced at the portion of the energization time t6 and expanded at the portion of the energization time t7. Further, the axis of current is shown enlarged from the actual one as it becomes higher.

Also, in the embodiment of FIG. 4, the warming up operation conditions are set based on the input voltage HV and the ambient temperature Tc (temperature of the electrolytic capacitor 1), but is not limited thereto. It may be set based only on the input voltage HV. On the contrary, it may be set based only on the ambient temperature Tc. However, by performing the warming up operation based on both the input voltage HV and the ambient temperature Tc as in the embodiment, control can be executed more accurately.

Further, in the warming up operation of above (3), the rate of increase in the current is changed in two stages, but may be changed more finely in multiple stages of three or more stages.

Furthermore, although the three-phase inverter circuit 2 has been described in the embodiment, the present invention is not limited to this. The inverter circuit 2 may have any number of phases such as four phases, and may be set appropriately according to the number of phases of the motor 5 (electric motor) to be applied.

Also, it is needless to say that the inverter device IV is not limited to the in-vehicle inverter device of the embodiment, but can be applied to various electric devices such as ordinary air conditioners.

DESCRIPTION OF REFERENCE NUMERALS

1 electrolytic capacitor
2 inverter circuit
3 control device
4 temperature sensor
5 motor (electric motor)
6u to 6w, 7u to 7w switching element
BAT battery
ESR internal resistance component
IV inverter device

The invention claimed is:

1. An inverter device comprising:
an electrolytic capacitor which smooths an input voltage to generate a DC voltage;
an inverter circuit which generates an AC voltage from the DC voltage to drive an electric motor;
a temperature sensor which detects a temperature of the electrolytic capacitor or an ambient temperature of the electrolytic capacitor; and
a control device which controls the drive of a plurality of switching elements included in the inverter circuit,
wherein in the case where the temperature detected by the temperature sensor is lower than a predetermined temperature, the control device on-drives specific switching elements selected out of the switching elements before starting a normal operation of the electric motor to thereby execute a warming up operation of allowing a current that controls a ripple voltage of the DC voltage in the electrolytic capacitor within a permissible range to flow through the electric motor at a predetermined rate of increase while keeping the electric motor stopped.

2. The inverter device according to claim 1, wherein the control device changes a rate of increase in the current flowing through the electric motor, based on the input voltage and the temperature detected by the temperature sensor.

3. The inverter device according to claim 2, wherein the control device changes the rate of increase in the current flowing through the electric motor in a direction to lower the rate of increase in the current as the input voltage is higher.

4. The inverter device according to claim 3, wherein the control device changes the value of the current flowing through the electric motor in a direction to lower the value of the current at the start of the warming up operation as the input voltage is higher.

5. The inverter device according to claim 2, wherein the control device changes the rate of increase in the current flowing through the electric motor in a direction to lower the rate of increase in the current as the temperature detected by the temperature sensor is lower.

6. The inverter device according to claim 5, wherein the control device changes the value of the current flowing through the electric motor in a direction to lower the value of the current at the start of the warming up operation as the temperature detected by the temperature sensor is lower.

7. The inverter device according to claim 1, wherein in the warming up operation, the control device changes the rate of increase in the current flowing through the electric motor in multiple stages according to the passage of time.

8. The inverter device according to claim 7, wherein the control device changes the rate of increase in the current flowing through the electric motor in a direction to increase the rate of increase in the current as time elapses from the start of the warming up operation.

9. The inverter device according to claim 1, wherein the control device limits the value of the current flowing through the electric motor in the normal operation after the completion of the warming up operation.

10. The inverter device according to claim 3, wherein the control device changes the rate of increase in the current flowing through the electric motor in a direction to lower the rate of increase in the current as the temperature detected by the temperature sensor is lower.

11. The inverter device according to claim 4, wherein the control device changes the rate of increase in the current flowing through the electric motor in a direction to lower the rate of increase in the current as the temperature detected by the temperature sensor is lower.

12. The inverter device according to claim 2, wherein in the warming up operation, the control device changes the rate of increase in the current flowing through the electric motor in multiple stages according to the passage of time.

13. The inverter device according to claim 3, wherein in the warming up operation, the control device changes the rate of increase in the current flowing through the electric motor in multiple stages according to the passage of time.

14. The inverter device according to claim 4, wherein in the warming up operation, the control device changes the rate of increase in the current flowing through the electric motor in multiple stages according to the passage of time.

15. The inverter device according to claim 5, wherein in the warming up operation, the control device changes the rate of increase in the current flowing through the electric motor in multiple stages according to the passage of time.

16. The inverter device according to claim 2, wherein the control device limits the value of the current flowing through the electric motor in the normal operation after the completion of the warming up operation.

17. The inverter device according to claim 3, wherein the control device limits the value of the current flowing through the electric motor in the normal operation after the completion of the warming up operation.

18. The inverter device according to claim 5, wherein the control device limits the value of the current flowing through the electric motor in the normal operation after the completion of the warming up operation.

19. The inverter device according to claim 6, wherein the control device limits the value of the current flowing through the electric motor in the normal operation after the completion of the warming up operation.

20. The inverter device according to claim 8, wherein the control device limits the value of the current flowing through the electric motor in the normal operation after the completion of the warming up operation.

* * * * *